INVENTOR.
PAUL BRINDUSE
BY Bair, Freeman & Molinare
ATTORNEYS

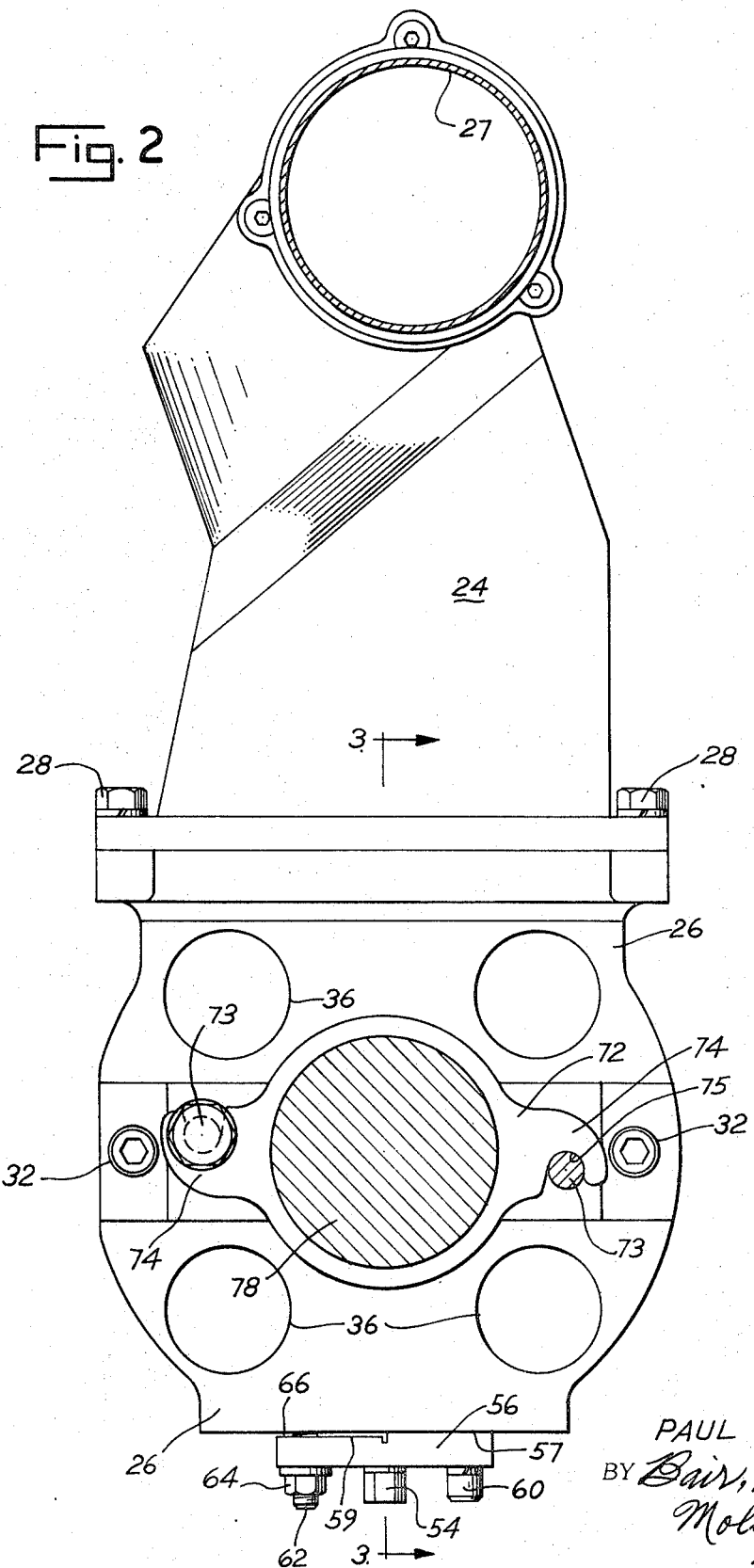

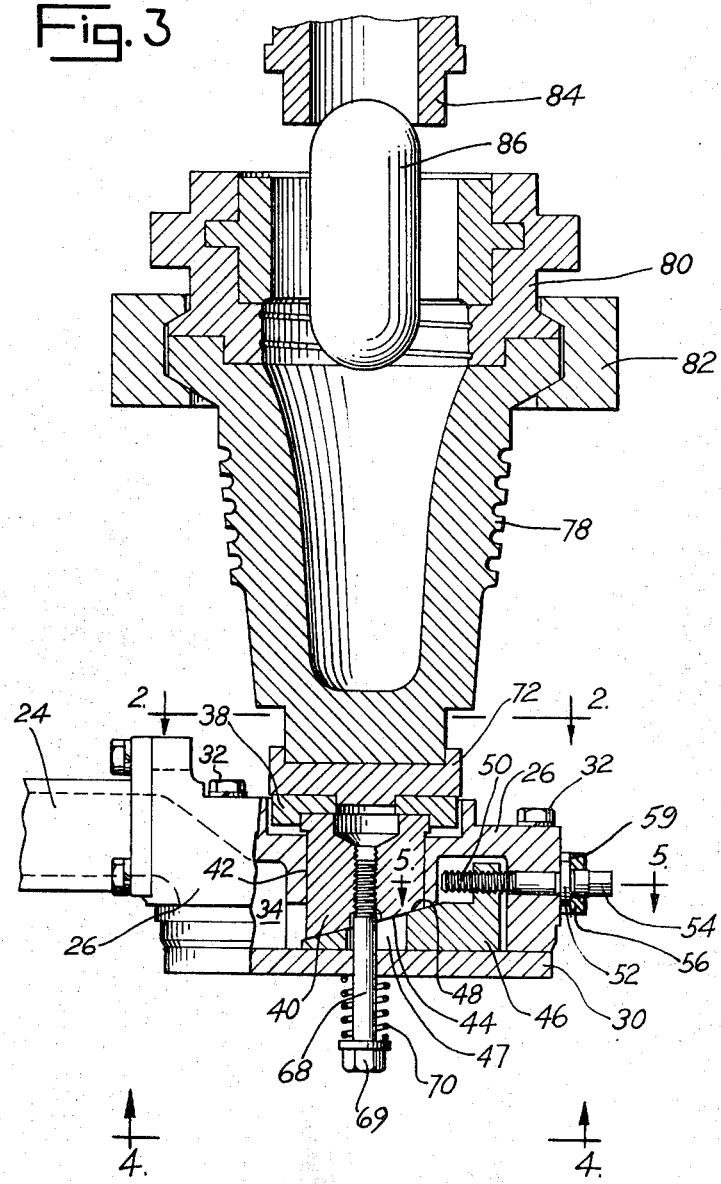

Sept. 22, 1970            P. BRINDUSE            3,529,950
ADJUSTABLE-BLANK CARRIER FOR GLASSWARE FORMING MACHINES
Filed April 29, 1968            4 Sheets-Sheet 4
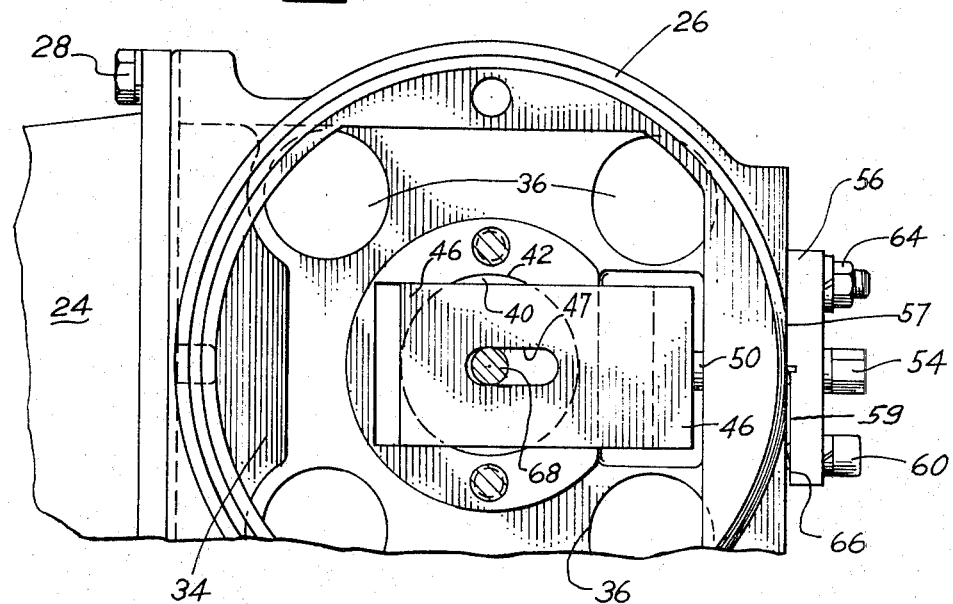
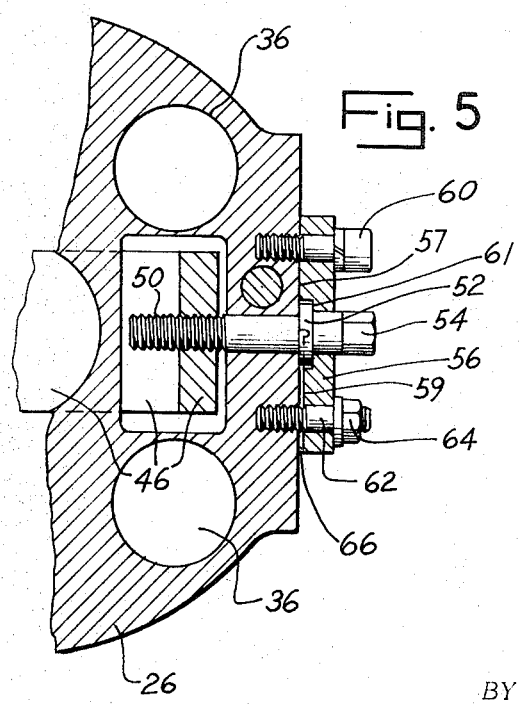
INVENTOR.
PAUL BRINDUSE
BY Bair, Freeman & Molinare
ATTORNEYS

United States Patent Office 3,529,950
Patented Sept. 22, 1970

3,529,950
ADJUSTABLE-BLANK CARRIER FOR GLASSWARE FORMING MACHINES
Paul Brinduse, Anderson, Ind., assignor to Lynch Corporation
Filed Apr. 29, 1968, Ser. No. 725,007
Int. Cl. C03b 9/40
U.S. Cl. 65—323                         10 Claims

ABSTRACT OF THE DISCLOSURE

A blank or parison mold carrier for a glassware forming machine is provided with adjusting means to change the elevation of the blank in a micrometric manner to thereby accurately position the blank relative to a finish ring and a clamp for clamping the blank and the finish ring together. The adjusting means includes an arbor slidable axially of the blank, and a wedge slidable at right angles to the arbor and adjusted by an adjusting screw, inclined surfaces between the wedge and the arbor being at such angle as to provide comparatively fine increments of axial adjustment of the arbor compared to increments of rotation of the adjusting screw. A simple locking means is also provided for the adjusting screw.

BACKGROUND OF THE INVENTION

The Youkers Pat. No. 2,874,516 discloses a three-neck-ring type of glassware forming machine having a blank station where a parison is blown, a blow station where the ware is blown to final shape and a take-out station adjacent a take-away conveyor. At the blank station means is provided for supporting a blank or parison mold. The glassware forming machine includes a rotating turret that carries three-neck-rings which are operable to support the parison between the blank station and the blow station, and to support the finished ware between the blow station and the take-out station. These neck rings are at a predetermined elevation. At the blank station a blank carrier is provided, and it is desirable to have a simple and conveniently and readily operable adjusting means for the elevation of the blank carrier so that the upper end of the blank will properly coact with the finish ring and also with a clamp provided at the blank station for clamping the upper end of the blank and the lower surface of the finish ring tightly together to avoid a "flash" on the parison at the parting line between the blank and the finish ring.

Accordingly, one object of my present invention is to provide a simple design for such adjusting means comprising mounting means for the blank carrier and an arbor slidable in a bore of the body member, an adjusting screw being rotatable in the body member and operatively coacting with the arbor to adjust it axially of the bore.

Another object is to provide a wedge slidable laterally of the bore wherein the arbor and the wedge have mating inclined surfaces and the adjusting screw cooperates with the wedge to impart movement to it laterally of the bore.

Still another object is to provide the screw with a push-and-pull connection with the wedge for positive adjustment of the wedge in either an arbor-elevating or an arbor-depressing direction.

A further object is to provide for fineness of adjustments by making the mating inclined surfaces obtuse relative to the arbor axis and acute relative to the adjusting screw axis.

Still a further object is to provide resilient means to bias the inclined surfaces constantly into contact with each other.

An additional object is to provide a novel means for locking the adjusting screw against rotation comprising a flange on the screw and a locking bar having first and second surfaces, one permanently located in fixed position relative to the body member and the other one spaced therefrom, an adjusting screw being provided to spring the second surface toward the body member and thereby into frictional contact with a flange on the screw and the flange into frictional contact with the body member.

BRIEF SUMMARY OF THE INVENTION

A body member is supported on the glassware forming machine at the blank station thereof and has a vertical bore in which an arbor is slidable, means being provided for supporting a blank on the upper end of the arbor. A wedge is slidable laterally of the arbor bore and has an inclined surface contacting a similarly inclined surface of the arbor, and is adjusted by a push-and-pull adjusting screw. A spring is provided to insure constant contact of the inclined surfaces with each other in all positions of adjustment. Lock means is provided to prevent rotation of the screw, once the desired adjustment is made.

BRIEF DESCRIPTION OF THE DRAWINGS

FIG. 2 is an enlarged plan view of the portion of FIG. 1 within the oval outline "2" with certain portions shown in section.

FIG. 3 is a reduced-size vertical sectional view on the line 3—3 of FIG. 2 showing my adjustable blank carrier associated with a blank, neck ring and clamp of the glassware forming machine, FIG. 2 being taken on the line 2—2 thereof.

FIG. 4 is a bottom plan view of FIG. 3, (enlarged to the scale of FIG. 2) a cover plate 30 being omitted, and a rod 68 and certain bolts being shown in section in order to show internal details of construction, and FIG. 5 is a sectional view on the line 5—5 of FIGS. 2 and 3 and is at the same scale as FIGS. 2 and 4.

DESCRIPTION OF THE PREFERRED EMBODIMENT

Figure 1:
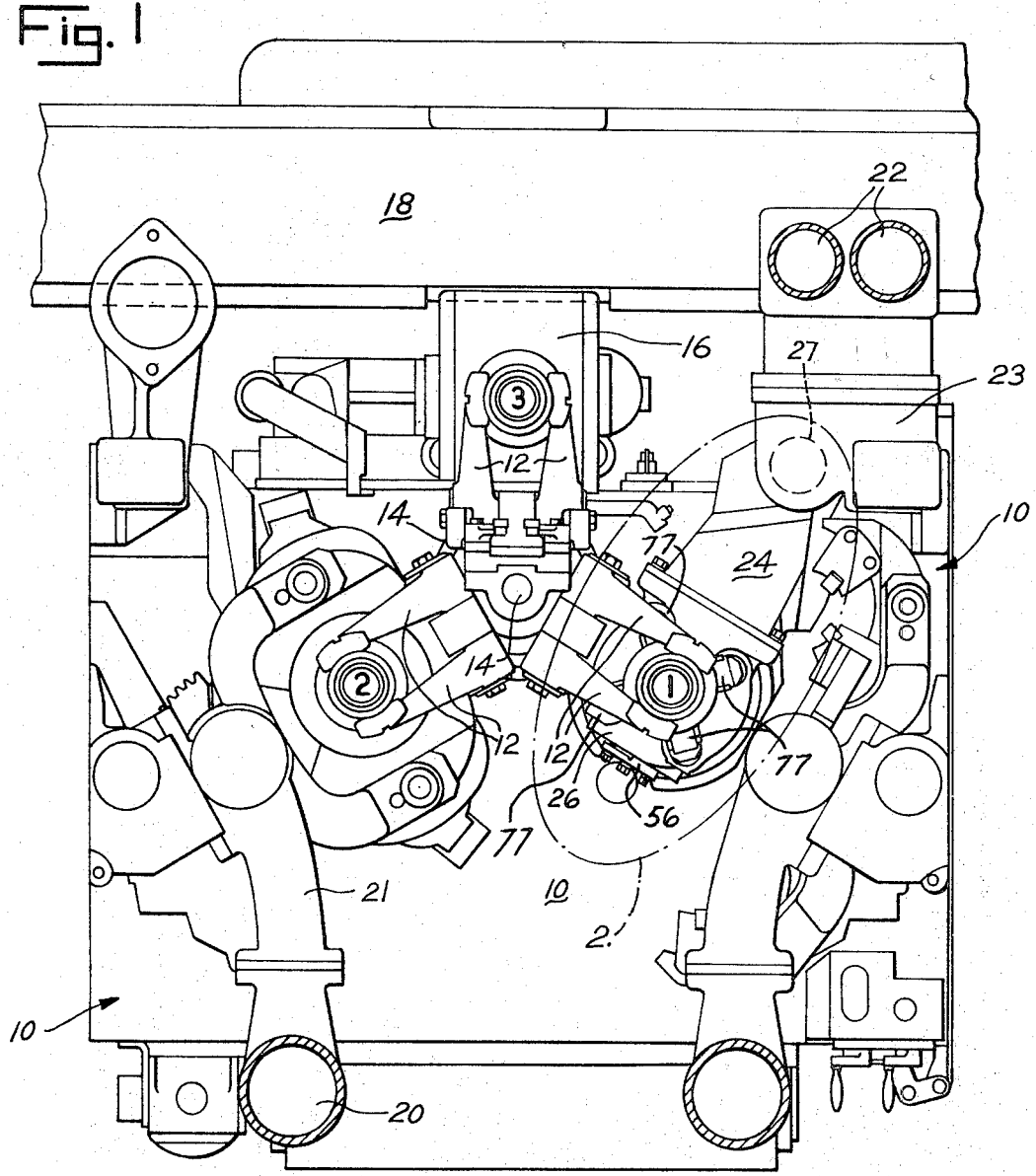
FIG. 1 is a plan view of a glassware forming machine of the general type shown in the Youkers patent above referred to and to which my adjustable blank carrier is applied.

On the accompanying drawings, a three-station glassware forming machine of the three-neck ring type is shown in FIG. 1. The three stations are identified 1, 2 and 3. Station 1 is a blank station, station 2 is a blow station and station 3 is a take-out station.

The base of the glassware forming machine is shown generally at 10, and three pairs of neck ring arms 12 are shown carried by a turret 14 rotatable on a vertical axis. At the take-out station 3 a dead plate 16 such as shown in Hamilton application Ser. No. 515,108, filed Dec. 20, 1965, is illustrated which delivers ware to a take-away conveyor 18, which in turn delivers the finished ware to an annealing lehr in the usual way. Blow mold cooling wind is delivered by conduits 22 and 23 to the blank station 1. At station 1 I supply a special design of blank carrier body 26 secured as by cap screws 28 shown in FIG. 2 to a blank carrier bracket 24. The bracket 24 is hollow to serve as a conduit for the blank cooling wind from the conduits 22 and 23, and includes a vertical tube 27 shown in FIG. 2 serving as a telescoping connection as the blank carrier bracket 24 is vertically movable during certain glassware forming operations because of both charging and plunger pressing operations performed at station 1.

The bottom of the blank carrier body 26 is open as shown in FIG. 4, but when assembled into the machine it is closed by a cover plate 30 shown in FIG. 3 so as to form a cavity 34 within the body. The cover plate is held in position by cap screws 32. Cooling wind exit openings 36 (see FIG. 2) communicate with the cavity 34 and lead to four cooling nozzles 77 (see FIG. 1) projecting up alongside a blank 78 shown in FIG. 3.

A blank carrier is provided in the form of a base plate 38, best shown in FIG. 3, an arbor 40 and a blank register plate 72. The blank 78 is secured to the base plate 72 by cap screws or the like (not shown) and the base plate is readily removable for quickly changing from one blank 78 to another "on the fly" by clamp screws 73 and slots 75 in hook-shaped mounting ears (shown in FIG. 2) in an obvious manner.

The arbor 40 is vertically slidable in a bore 42 axially aligned with the blank 78, and has a slanting lower surface 44 coacting with a mating slanting upper surface 48 of a wedge 46. The wedge 46 is slidable on the cover plate 30 laterally of the arbor axis as shown in FIG. 3, and a wedge adjusting screw 50 is threaded therein. A lock flange 52 is provided on the adjusting screw and a lock bar 56 engages its outer surface, thus causing the adjusting screw to be of the push-and-pull type for the wedge 46.

In order to insure constant contact between the mating inclined surfaces 44 and 48, a pull rod 68 is provided for the arbor 40 and extends through a slot 47 of the wedge 46 and through the cover plate 30 to the exterior thereof as shown in FIG. 3, and terminates in a head 69. Interposed between the head 69 and the cover plate 30 is a compression spring 70.

The adjusting screw has a head 54 for an adjusting tool such as a socket wrench or the like, and the lock bar 56 has a surface 57 in permanent engagement with the body member 26, an anchor screw 60 being provided for this purpose. The lock bar has a second surface 59 spaced from the body member and adapted to be sprung theretoward by a lock nut stud 62 on which a lock nut 64 is rotatable.

A clearance space 66 permits springing action, upon such springing action a third surface 61 of the lock bar 56 frictionally engages the outer surface of the flange 52, as shown in FIG. 5, and thereby engages the inner surface of the flange against the adjacent surface of the body member 26 to effect the locking adjustment above referred to.

Referring to FIG. 3 a finish ring 80 of the glassware forming machine is shown, and is supported by the neck ring arms 12. When the blank 78 is elevated into contact with the neck ring 80, the elevation of the blank is critical as substantial contact between the upper end of the blank and the lower end of the neck ring is desired so that cone-shaped flanges may be tightly drawn together by means of clamps 82 which are later closed around the neck ring and the blank. For that reason micrometric adjustment of the elevation of the blank is desired, and is secured by the adjustable blank carrier of my present invention. FIG. 3 also shows the funnel 84 through which the gob of glass 86 falls for entering the cavity within the blank 78 in order to show the environment and purpose of my adjustable blank carrier.

Inasmuch as it is undesirable to shut down a glassware forming machine to make adjustments, I have provided a type of adjustment that can be made while the machine is in operation. While the blank carrier bracket 24 is periodically raised and lowered each cycle of operation of the machine, the adjusting screw 50 can be rotated for gradually raising the blank 78 until it lightly contacts the finish ring 80 at the upper end of the elevating stroke. The adjustment can then be locked by means of the lock nut 64.

I claim as my invention:

1. In an adjustable blank carrier for glassware forming machines, a body member having a bore oriented axially relative to the blank to be carried by said blank carrier, said blank carrier having mounting means for the blank and an arbor slidable in said bore, and means for adjusting said arbor axially in said bore, said means including an adjusting screw rotatable in said body member.

2. An adjustable blank carrier in accordance with claim 1 wherein said means for adjusting said arbor also includes a wedge slidable laterally of said bore, said arbor and said wedge having mating inclined surfaces and said adjusting screw cooperating with said wedge to impart movement thereto laterally of said bore.

3. An adjustable blank carrier in accordance with claim 3 wherein the axis of said screw is at substantially right angles to the axis of said arbor, and said screw has a push-and-pull connection with said wedge.

4. An adjustable blank carrier in accordance with claim 2 wherein the angle of said mating inclined surfaces is obtuse relative to said arbor axis and is acute relative to said adjusting screw axis.

5. An adjustable blank carrier in accordance wtih claim 2 wherein resilient means is provided to bias said inclined surfaces into contact with each other.

6. An adjustable blank carrier in accordance with claim 2 wherein a headed pull rod extends from said arbor through said wedge, and a spring is provided between the head of said pull rod and a portion of said body member to retain said inclined surfaces in engagement with each other in all positions of adjustment of said adjusting screw and wedge.

7. An adjustable blank carrier in accordance with claim 6 wherein said wedge has a slot through which said pull rod extends to permit adjustment of said wedge by said adjusting screw.

8. An adjustable blank carrier in accordance with claim 3 wherein a headed pull rod extends from said arbor through said wedge, and a spring is provided between the head of said pull rod and a portion of said body member to retain said inclined surfaces in engagement with each other in all positions of adjustment of said adjusting screw and wedge.

9. An adjustable blank carrier in accordance with claim 2 wherein means is provided for locking said adjusting screw against rotation comprising a flange on said screw, and clamping means engageable with said flange to force it into engagement with a portion of said body member.

10. An adjustable blank carrier in accordance with claim 8 wherein said clamp means comprises a locking bar having first and second surfaces, the first surface to contact said body member, means to permanently engage said first surface with said body member, the second surface being spaced from the body member, and means to spring said second surface toward said body member and thereby into frictional contact with said flange, and the flange into frictional contact with said body member.

References Cited

UNITED STATES PATENTS

| | | | |
|---|---|---|---|
| 1,662,861 | 3/1928 | McLaughlin | 65—323 XR |
| 1,679,502 | 8/1928 | Sears | 65—360 XR |
| 1,764,166 | 6/1930 | Hewitt | 65—323 XR |
| 1,843,160 | 2/1932 | Ingle | 65—360 XR |
| 1,974,841 | 9/1934 | Allen | 65—360 |
| 2,365,928 | 12/1944 | Allen | 65—360 XR |

FRANK W. MIGA, Primary Examiner

U.S. Cl. X.R.

65—231, 242, 359, 360, 361